(12) United States Patent
Kawamoto et al.

(10) Patent No.: US 8,255,573 B2
(45) Date of Patent: *Aug. 28, 2012

(54) COMMUNICATION NETWORK SYSTEM, GATEWAY, DATA COMMUNICATION METHOD AND PROGRAM PROVIDING MEDIUM

(75) Inventors: Youji Kawamoto, Tokyo (JP); Motomasa Futagami, Kanagawa (JP); Motohiko Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 247 days.

This patent is subject to a terminal disclaimer.

(21) Appl. No.: 12/027,668

(22) Filed: Feb. 7, 2008

(65) Prior Publication Data

US 2008/0130666 A1    Jun. 5, 2008

Related U.S. Application Data

(62) Division of application No. 11/195,770, filed on Aug. 3, 2005, now Pat. No. 7,349,993, which is a division of application No. 09/795,106, filed on Mar. 1, 2001, now Pat. No. 7,194,558.

(30) Foreign Application Priority Data

Mar. 2, 2000   (JP) ................................. 2000-057607
Mar. 2, 2000   (JP) ................................. 2000-057608

(51) Int. Cl.
    *G06F 15/16* (2006.01)
(52) U.S. Cl. ............. 709/249; 709/218; 726/31; 726/12
(58) Field of Classification Search .......... 709/201–203, 709/208–222, 200, 248–249; 725/1–4, 22, 725/25, 78–80, 92, 114–115, 133, 141–142, 725/145, 153; 707/609–623, 634–639, 650, 707/652, 655–660, 674, 686, 694–695; 705/51–59; 726/12, 26–33; 717/120–122, 168–178

See application file for complete search history.

(56) References Cited

U.S. PATENT DOCUMENTS

| | | | |
|---|---|---|---|
| 5,073,852 A | | 12/1991 | Siegel et al. |
| 5,745,879 A | * | 4/1998 | Wyman ........................ 705/1.1 |
| 5,852,660 A | | 12/1998 | Lindquist et al. |
| 5,864,827 A | | 1/1999 | Wilson |

(Continued)

OTHER PUBLICATIONS

K. Kawachiya, et al., "VideoProxy: A Media and Protocol Converter for Internet Video," *Global Informatin Infrastructure (GII) Evolution*, Oct. 1, 1996, pp. 541-550.

(Continued)

*Primary Examiner* — Greg C Bengzon
(74) *Attorney, Agent, or Firm* — Oblon, Spivak, McClelland, Maier & Neustadt, L.L.P.

(57) ABSTRACT

This invention relates to provide a communication network system, a gateway, and a data communication method, in which the gateway has an advanced functionality. A person who issues an access request can retrieve a desired access destination easily by the following configuration: functions of routing information providing and authentication processing are added to a gateway that performs protocol conversion between two different communication networks; when an access request is issued from a public communication network such as Internet to a terminal in a local (private) communication network connected to the gateway, a request terminal is authenticated to enable prevention of unauthorized data writing and reading; and an access request user who succeeded in the authentication is provided with an active terminal list comprising accessible terminal information, or with a user condition table.

12 Claims, 12 Drawing Sheets

U.S. PATENT DOCUMENTS

| | | | |
|---|---|---|---|
| 5,940,504 A * | 8/1999 | Griswold | 705/59 |
| 5,982,889 A * | 11/1999 | DeMont | 705/51 |
| 6,032,201 A * | 2/2000 | Tillery et al. | 710/8 |
| 6,049,670 A * | 4/2000 | Okada et al. | 717/177 |
| 6,094,479 A | 7/2000 | Lindeberg et al. | |
| 6,094,578 A | 7/2000 | Purcell et al. | |
| 6,169,976 B1 * | 1/2001 | Colosso | 705/59 |
| 6,223,291 B1 * | 4/2001 | Puhl et al. | 726/28 |
| 6,266,784 B1 * | 7/2001 | Hsiao et al. | 714/6.3 |
| 6,321,254 B1 * | 11/2001 | Meyer et al. | 709/213 |
| 6,377,996 B1 | 4/2002 | Lumelsky et al. | |
| 6,397,381 B1 * | 5/2002 | Delo et al. | 717/174 |
| 6,496,979 B1 * | 12/2002 | Chen et al. | 717/178 |
| 6,529,950 B1 | 3/2003 | Lumelsky et al. | |
| 6,535,517 B1 | 3/2003 | Arkko et al. | |
| 6,574,612 B1 * | 6/2003 | Baratti et al. | 705/59 |
| 6,631,122 B1 | 10/2003 | Arunachalam et al. | |
| 6,636,894 B1 * | 10/2003 | Short et al. | 709/225 |
| 6,674,767 B1 | 1/2004 | Kadyk et al. | |
| 6,728,748 B1 | 4/2004 | Mangipudi et al. | |
| 6,771,637 B1 | 8/2004 | Suzuki et al. | |
| 6,775,296 B1 | 8/2004 | Kitamura | |
| 6,799,277 B2 * | 9/2004 | Colvin | 726/22 |
| 6,820,214 B1 * | 11/2004 | Cabrera et al. | 714/15 |
| 6,851,073 B1 * | 2/2005 | Cabrera et al. | 714/15 |
| 6,934,722 B1 * | 8/2005 | Goshey et al. | 1/1 |
| 7,020,704 B1 * | 3/2006 | Lipscomb et al. | 709/226 |
| 7,080,051 B1 * | 7/2006 | Crawford | 705/400 |
| 7,146,645 B1 * | 12/2006 | Hellsten et al. | 726/33 |
| 7,203,477 B2 * | 4/2007 | Coppinger et al. | 455/403 |
| 7,246,246 B2 * | 7/2007 | Kupka et al. | 713/189 |
| 7,640,596 B1 * | 12/2009 | Cho et al. | 726/31 |
| 2002/0002638 A1 | 1/2002 | Obara | |
| 2002/0095671 A1 * | 7/2002 | Delo et al. | 717/174 |
| 2003/058277 A1 | 3/2003 | Bowman-Amuah | |
| 2004/0225894 A1 * | 11/2004 | Colvin | 713/200 |
| 2008/0022276 A1 * | 1/2008 | Coppinger et al. | 717/178 |

OTHER PUBLICATIONS

D. Einert, et al., "The Snatch Gateway: Translation of Higher Level Protocols," *Journal of Telecommunication Networks*, vol. 2, No. 1, 1983, pp. 83-102.

Joe Desbonnet, et al., "System Architecture and Implementation of a CEBus/Internet Gateway," IEEE 1997, pp. 1057-1062.

Peter M. Corcoran, et al., "Browser-Style Interfaces to a Home Automation Network," *IEEE*, 1997, pp. 1063-1069.

Takeshi Saito, et al., "Homenetwork Architecture Considering Digital Home Appliances", Intstitute of Electronics, Information and Communication Engineers technical study reports IN97-128, vol. 97, No. 368, Nov. 6, 1997, pp. 57-64 (with English Abstract).

* cited by examiner

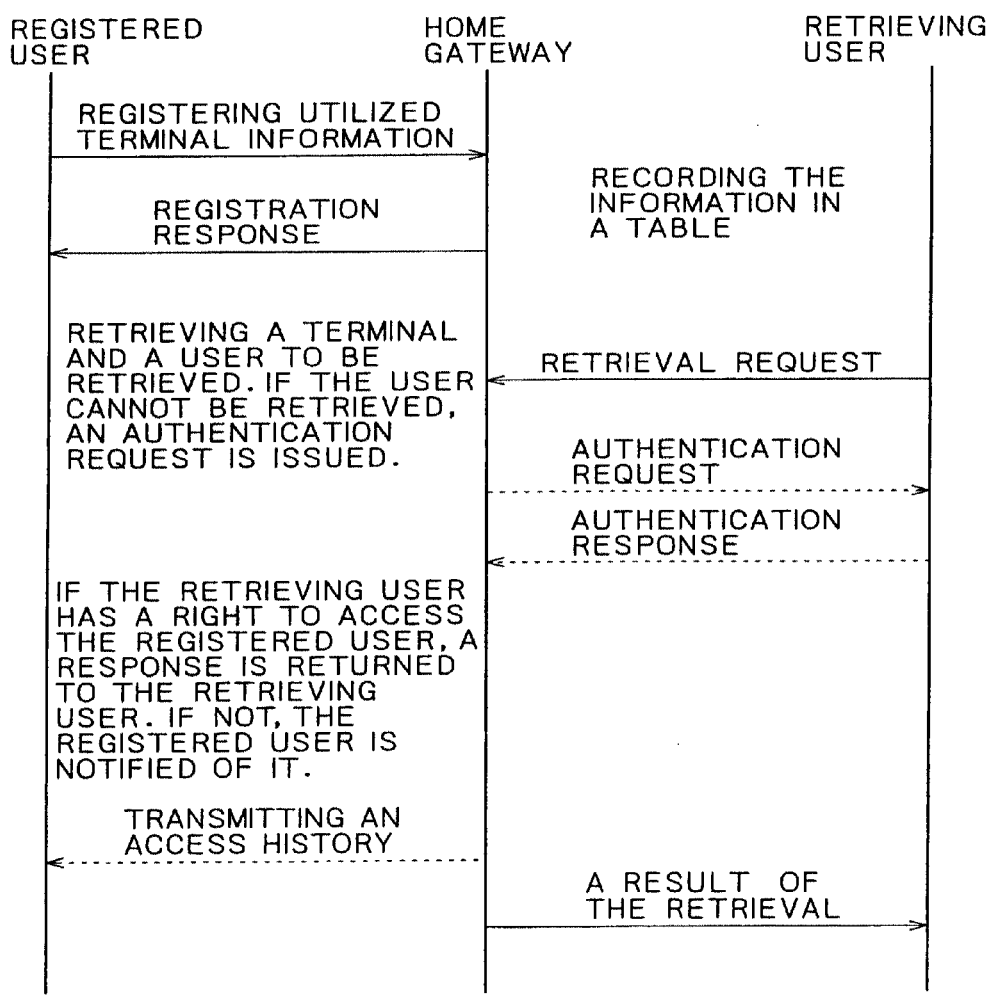

COMMUNICATION NETWORK SYSTEM, GATEWAY, DATA COMMUNICATION METHOD AND PROGRAM PROVIDING MEDIUM

CROSS-REFERENCE TO RELATED APPLICATION

The present divisional application claims the benefit of priority under 35 U.S.C. §120 to application Ser. No. 11/195,770, filed Aug. 3, 2005, which is a divisional of application Ser. No. 09/795,106 filed on Mar. 1, 2001, and under 35 U.S.C. §119 from Japanese applications Nos. 2000-057607 and 2000-057608, both filed on Mar. 2, 2000, the entire contents of each of which are hereby incorporated herein by reference.

BACKGROUND OF THE INVENTION

Field of the Invention

The present invention relates to a communication network system, a gateway, a data communication method, and a program providing medium, more specifically, to a communication network system, a gateway, a data communication method, and a program providing medium, which enable data communication having advanced functionality by adding functions of routing information providing processing and authentication processing to a gateway that performs communication protocol conversion between a public communication network and a private communication network such as LAN.

A gateway is used as a device that enables interconnection between a public communication network such as Internet and telephone line and a private communication network such as LAN. The gateway provides mutual communication by performing communication protocol conversion between the public communication network and the private communication network. The gateway is also used in mutual protocol conversion between LANs (Local Area Network) that are constructed as private communication networks. A typical example of LANs is Ether-net, which provides connections of two or more communication terminals including personal computers on a single cable. As a method for avoiding a collision of packets transmitted and received on two or more computers, and the like, CSMA/CD (Carrier Sense Multiple Access/Collision Detection) is adopted.

As conventionally known connection devices for communication networks, for example, there are a modem unit that performs digital-to-analog conversion to connect an analogue telephone to a digital line, a hub that performs connection processing at the physical layer level of OSI layers, a repeater, a bridge that performs processing at the data link layer level of OSI layers, a router that performs processing of the network layer of OSI layers, and the like. Main functions of the repeater are amplification processing and distortion restoring processing to restore a signal level attenuated in the process of transmission. The bridge has a function of performing filtering processing for checking a source (originator) address and a destination (recipient) address, which are managed by the data link layer, to determine whether or not a packet is to be transmitted. The router has a function of relaying and exchanging packets according to protocol definition of the network layer. The gateway has an overall exchange function that is adaptable to OSI layers from the first to the seventh layer, that is to say, from the physical layer to the application layer. The gateway, therefore, provides connection between different networks.

However, because the various kinds of communication network connection devices described above are devised to provide only mutual communication with a network having a different protocol, there is no communication network connection device that has an application involved in processing with advanced functionality including functions of routing information providing processing and authentication processing for various kinds of terminals such as personal computers connected to a network.

SUMMARY OF THE INVENTION

An object of the present invention is to provide a communication network system, a gateway, a data communication method, and a program providing medium, which enable communication having advanced functionality by adding functions of routing information providing processing and authentication processing to a gateway in a network configuration, such as Ether-net, in which communication-capable terminals including two or more personal computers, audio devices, and video devices are connected.

According to a first aspect of the present invention, there is provided a communication network system characterized in that communication between two communication networks is made possible by involving a gateway for performing communication protocol conversion between the two communication networks communicating according to different protocols; the communication network system has a configuration in which the gateway receives a request to access a terminal or a registered user in a local communication network connected to the gateway from an outside communication network; and the gateway selects accessible terminals from terminals or registered user terminals in the local communication network connected to the gateway, generates an active terminal list and then transmits the active terminal list to a request terminal that has performed the access request.

In addition, in an embodiment of the communication network system according to the present invention, the communication network system is characterized in that the gateway generates a user condition table as the active terminal list which registers routing information that enables communication with registered users; and the gateway provides the request terminal with the registered users' routing information in the user condition table.

In addition, in an embodiment of the communication network system according to the present invention, the communication network system is characterized in that the gateway receives device unique information as specific information from a terminal in the local communication network connected to the gateway and from an unconnected terminal including mobile telephones; and the gateway extracts terminals having appropriate unique information from registered device data in a home gateway, and makes a table of routing information of the extracted terminals to generate the active terminal list.

In addition, in an embodiment of the communication network system according to the present invention, the communication network system is characterized in that the gateway provides only specific users with accessible terminal information by performing authentication processing for the request terminal or the request user that issued the access request.

In addition, in an embodiment of the communication network system according to the present invention, the communication network system is characterized in that the gateway has setting information specifying a range of access right for each request terminal or each request user that issued the access request; and based on terminal or user information obtained by the authentication processing for the request terminal or the request user, the gateway provides access destination information with restriction according to the setting information.

In addition, in an embodiment of the communication network system according to the present invention, the communication network system is characterized in that the gateway keeps a log of access requests from retrieving users having no access right as an access history and transmits the access history to registered users.

In addition, according to a second aspect of the present invention, there is provided a gateway, in which communication protocol conversion between two communication networks communicating according to different protocols is performed; the gateway has a configuration in which the gateway receives a request to access a terminal or a registered user in a local communication network connected to the gateway from an outside communication network; and the gateway selects accessible terminals from terminals or registered user terminals in the local communication network connected to the gateway, generates an active terminal list, and then transmits the active terminal list to a request terminal that has performed the access request.

In addition, in an embodiment of the gateway according to the present invention, the gateway is characterized in that the gateway generates a user condition table as the active terminal list which registers routing information that enables communication with registered users; and the gateway provides the request terminal with the registered users' routing information in the user condition table.

In addition, in an embodiment of the gateway according to the present invention, the gateway is characterized in that the gateway receives device unique information as specific information from a terminals in the local communication network connected to the gateway, and from an unconnected terminal including mobile telephones; and the gateway extracts terminals having appropriate unique information from registered device data in a home gateway, and makes a table of routing information of the extracted terminals to generate the active terminal list.

In addition, in an embodiment of the gateway according to the present invention, the gateway is characterized in that the gateway provides only specific users with accessible terminal information by performing authentication processing for the request terminal or the request user that issued the access request.

In addition, in an embodiment of the gateway according to the present invention, the gateway is characterized in that the gateway has setting information specifying a range of access right for each request terminal or each request user that issued the access request; and based on terminal or user information obtained by the authentication processing for the request terminal or the request user, the gateway provides access destination information with restriction according to the setting information.

In addition, in an embodiment of the gateway according to the present invention, the gateway is characterized in that the gateway keeps a log of access requests from retrieving users having no access right as an access history and transmits the access history to registered users.

In addition, according to a third aspect of the present invention, there is provided a data communication method in a communication network system, in which communication between two communication networks is made possible by involving a gateway for performing communication protocol conversion between the two communication networks communicating according to different protocols; and the data communication method comprises a request receiving step for receiving a request to access a terminal or a registered user in a local communication network connected to the gateway from an outside communication network; a list generation step for selecting accessible terminals from terminals or registered user terminals in the local communication network connected to the gateway to generate an active terminal list; and a list transmission step for transmitting the active terminal list to a request terminal that has performed the access request.

In addition, in an embodiment of the data communication method according to the present invention, the data communication method is characterized in that the list generation step is a step for generating a user condition table which registers routing information that enables communication with registered users; and the list transmission step is a step for transmitting the registered users' routing information in the user condition table to the request terminal.

In addition, in an embodiment of the data communication method according to the present invention, the data communication method is characterized in that the list generation step receives device unique information as specific information from a terminal in the local communication network connected to the gateway and from an unconnected terminal including mobile telephones; and the list generation step extracts terminals having appropriate unique information from registered device data in a home gateway, and generates routing information of the extracted terminals by listing them.

In addition, in an embodiment of the data communication method according to the present invention, the data communication method is characterized in that the list generation step receives device unique information as specific information from a terminal in the local communication network connected to the gateway and from an unconnected terminal including mobile telephones; and the list generation step extracts terminals having appropriate unique information from registered device data in a home gateway, and generates routing information of the extracted terminals by listing them.

In addition, in an embodiment of the data communication method according to the present invention, the data communication method is characterized in that the gateway generates setting information specifying a range of access right for each request terminal or each request user that issued the access request; and based on terminal or user information obtained by the authentication processing for the request terminal or the request user, the gateway provides access destination information with restriction according to the setting information.

In addition, in an embodiment of the data communication method according to the present invention, the data communication method is characterized in that a log of access requests from request terminals or request users that have no access right is kept as an access history, and the access history is transmitted to registered users.

In addition, according to a fourth aspect of the present invention, there is provided a program providing medium, in which the medium provides a computer program for executing, on a computer system, data communication processing in a communication network system that enables communication between two communication networks by involving a gateway for performing communication protocol conversion between the two communication networks communicating according to different protocols; and the program providing medium has a configuration in which the computer program comprises a request receiving step for receiving a request to access a terminal or a registered user in a local communication network connected to the gateway from an outside communication network; a list generation step for selecting accessible terminals from terminals or registered user terminals in the local communication network connected to the gateway to generate an active terminal list; and a list transmission step for transmitting the active terminal list to a request terminal that has performed the access request.

The program providing medium relating to the fourth aspect of the present invention is medium that provides a computer program in a computer-readable format for general-purpose computer systems capable of executing various program codes. There is no limit on a form of the medium. It may be storage medium such as CD, FD, and MO, or transmission medium such as network, or the like.

Such program providing medium specifies structurally and functionally synergistic relationship between the computer program and the medium for providing in order to realize a given function of the computer program on the computer system. In other words, installing the computer program to the computer system through the medium for providing causes synergistic functionality to effect, and thereby similar effects to those of the other aspects of the present invention can be obtained.

Further objects, characteristics, and advantages of the present invention will become apparent by more detailed description based on the following embodiments of the present invention and the attached drawings.

BRIEF DESCRIPTION OF THE DRAWINGS

FIG. 12 is a diagram illustrating a processing sequence of user communication-destination retrieving-processing using a gateway in a communication network system according to the present invention.

DETAILED DESCRIPTION OF THE PREFERRED EMBODIMENTS

Outline of System

Figure 1:
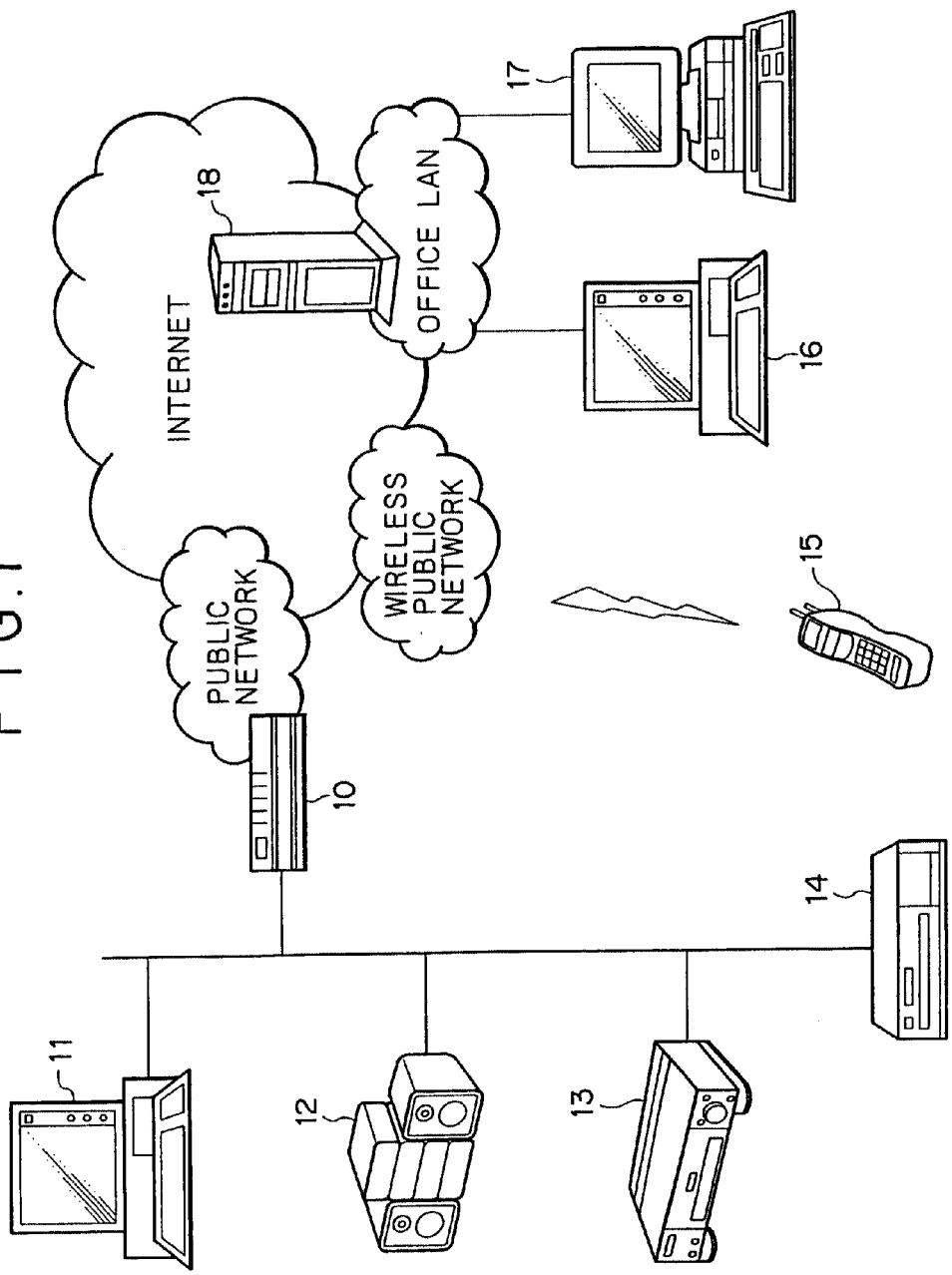
FIG. 1 is a diagram illustrating an outline of a communication network system to which a configuration according to the present invention is applied.

FIG. 1 is a configuration diagram to which a communication network system, a gateway, a data communication method according to the present invention can be applied. In FIG. 1, a home gateway 10 is connected between a public communication network (for example, such as a general telephone line, a cable television, and ISDN) and a private communication network (such as LAN (Local Area Network), and Ether-net) that is in conformity with TCP/IP (Transmission Control Protocol/Internet Protocol). The home gateway 10 performs communication protocol conversions on both sides.

A personal computer 11, an audio device 12, a video device 13, and a settop box 14 as various terminal devices capable of communicating via LAN are connected to the LAN as a private communication network connected to the home gateway 10. A home gateway 10 uses Internet, which is connected through the public communication network, as a communication medium. In addition, the home gateway 11 is connected to a wireless public communication network using for example CDMA (Code Division Multiple Access) method, or connected to a remote office LAN. The home gateway 11 has a configuration that is capable of data communication with mobile telephone 15 via Internet and the wireless public communication network and that is capable of data communication with in-house personal computers 16, 17 via Internet and the office LAN. Firewall 18, which is configured with for example a proxy server, is placed between the office LAN and Internet. The firewall 18 is configured to guard against an unauthorized access to the office LAN from outside.

In the communication network system as shown in FIG. 1, the home gateway 10 is conventionally configured only to perform protocol conversion between the public communication network (for example, such as cable television and ISDN) and the private communication network such as LAN. The home gateway 10 according to the present invention has not only the communication protocol conversion function but also data accumulation means for accumulating data required for various data processing (that are executed by various devices connected to LAN, for example, the personal computer 11, the audio device 12, the video device 13, and the settop box 14 as shown in FIG. 1) or for accumulating processed data generated by the processing.

Figure 2:
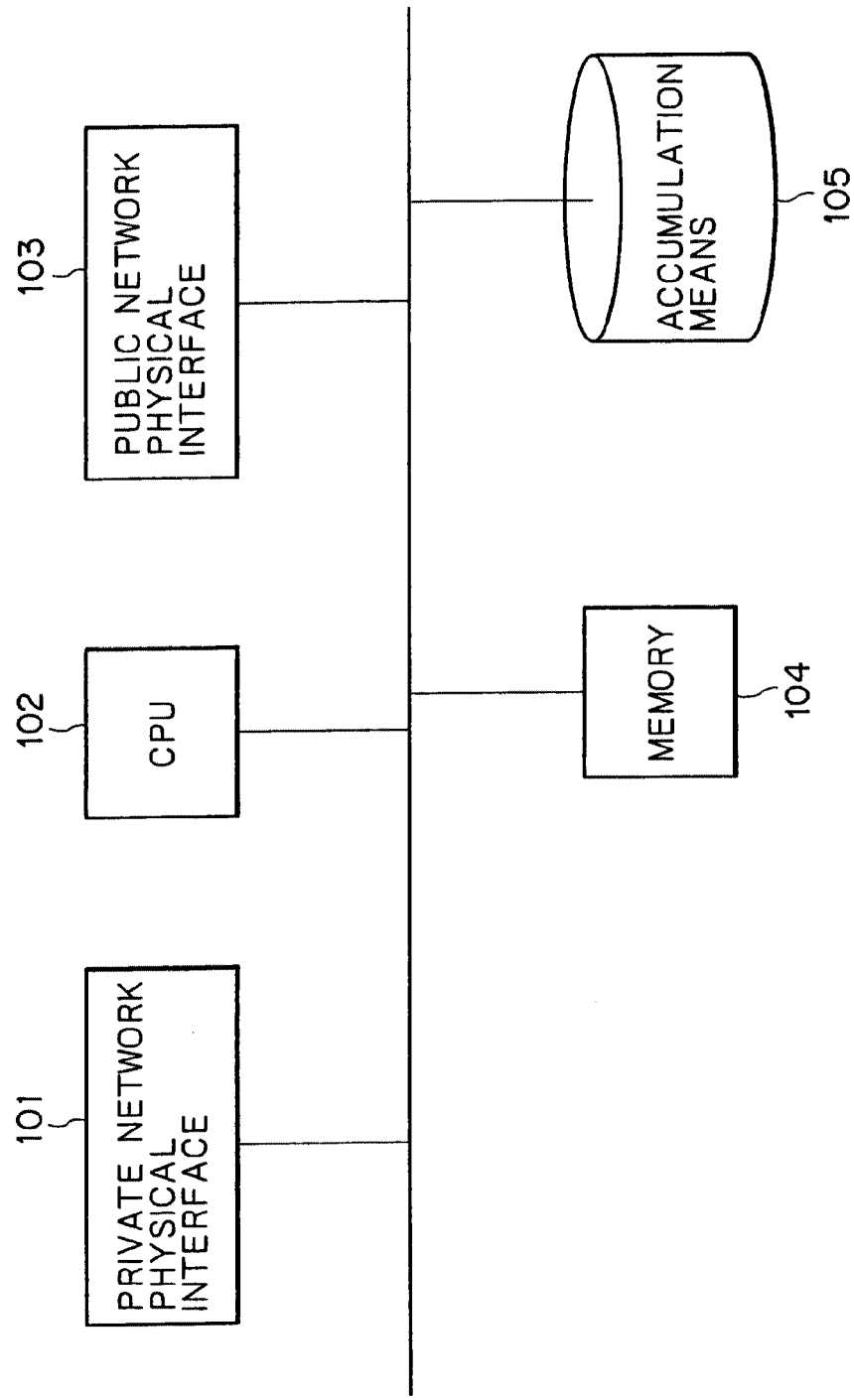
FIG. 2 is a block diagram illustrating a hardware configuration of a gateway according to the present invention.

FIG. 2 is a configuration block diagram illustrating the home gateway 10 in the system according to the present invention. The home gateway 10 mainly comprises private network physical interface 101, CPU 102, public network physical interface 103, memory 104, and accumulation means 105. As regards the private network physical interface 101, for example, if Ether-net is used as a private communication network, the private network physical interface 101 is configured to have a bridge function or a router function. If various wireless communication methods (such as I-Link; or wireless-LAN, Blue Tooth, Home-RF, or the like) are used, the private network physical interface 101 is configured to be an interface that is adaptable to each communication method.

The public network physical interface 103 is configured to be an interface having a bridge function that is adaptable to a signaling method of the public communication network. For example, if an ordinary telephone line is used as the public network, the public network physical interface 103 is configured to be a modem function interface. If a cable television line is used as the public network, it is configured to be a cable modem function interface. If WLL (Wireless Local Loop) is used, it is configured to be WLL modem function interface. The home gateway 10 performs protocol conversion between the public network physical interface 103 and the private network physical interface 101. Specifically, for example, if the public communication network is ISDN and the private communication network uses TCP/IP protocol, the home gateway 10 performs conversion processing from ISDN communication protocol to TCP/IP protocol, or performs back conversion processing. The CPU 102 provides a calculation function of performing the processing. The memory 104 comprising RAM, ROM, and the like is used for storing a processing program and for storing data when executing a program.

The home gateway 10 in the system according to the present invention further includes the data accumulation means 105. The data accumulation means 105 is data accumulation means for performing unified control of data that will be processed or has been processed in various terminals (for example, the personal computer 11, the audio device 12, the video device 13, and the settop box 14 as shown in FIG. 1), which are capable of transmitting data and connected to the private communication network via the home gateway 10. The data accumulation means 105 is also mass data accumulation means for storing internal data of the terminals connected to the private network. Specifically, the data accumulation means 105 is configured with a hard disk, CD-R, DVD, or the like. The system according to the present invention has a configuration in which the personal computer 11, the audio device 12, the video device 13, the settop box 14, and the like can store and read data in the accumulation means 105 of the home gateway 10.

Figure 3:
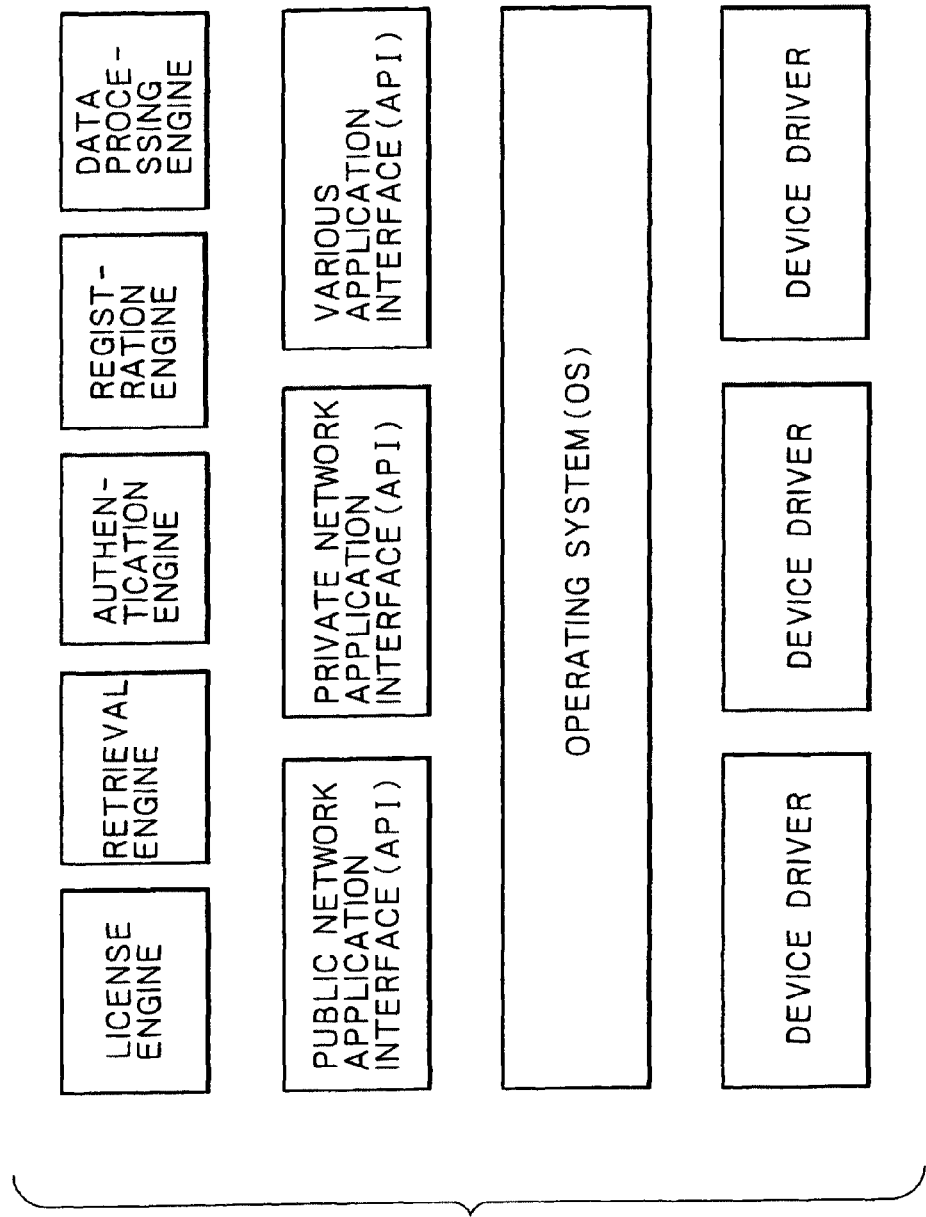
FIG. 3 is a diagram illustrating a software configuration of a gateway according to the present invention.

FIG. 3 shows a software block of the home gateway 10 in the system according to the present invention. As shown in FIG. 3, the software block comprises an operating system (OS) for controlling overall processing, device drivers for performing input and output controls of various devices including storage means for the OS, a public network application interface that functions as an interface of network processing performed via the public network physical interface 103, a private network application interface that functions as an interface of network processing performed via the private network physical interface 101, and various application interfaces that perform processing for the accumulation means 105 peculiar to the system of the present invention. In the top layer, a license engine, a retrieval engine, an authentication engine, a registration engine, and a data processing engine are configured as various processing engines peculiar to the system according to the present invention.

The following describes operations of the home gateway, which has the hardware configuration shown in FIG. 2 and the software configuration shown in FIG. 3, according to the present invention.

[Backup Function]

Figure 4:
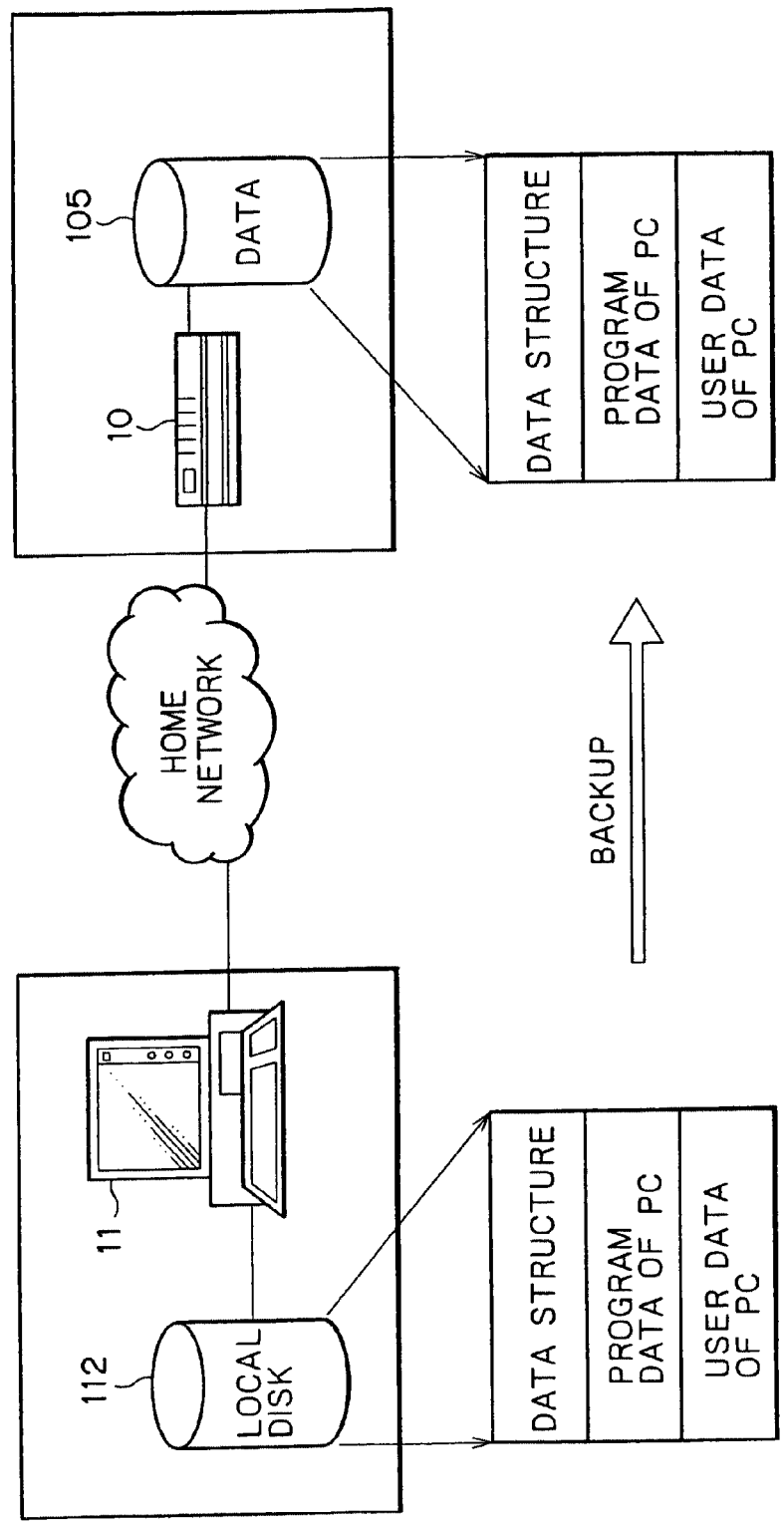
FIG. 4 is an explanatory diagram illustrating a backup function (example 1) of a gateway in a communication network system according to the present invention.

First, a backup processing function that uses the accumulation means 105 of the home gateway 10 according to the present invention is described. FIG. 4 is a diagram illustrating an outline of backup processing. A configuration in FIG. 4 shows the home gateway 10 and the personal computer 11 connected to the private communication network (ex. a home network) as LAN such as Ether-net. In FIG. 4, the personal computer 11 is shown as a device that is representative of connection devices for the private communication network. As shown in FIG. 1, however, the device may be the audio device 12, the video device 13, the settop box 14, or the other devices.

In FIG. 4, the personal computer 11 stores various programs, data, and the like in local disk 112 such as a hard disk built in the personal computer. On the other hand, the storage means 105 is also configured to store the same data as the stored data in the local disk 112 of the personal computer 11 as backup data.

Backup processing may be performed automatically or performed at user's will by taking the initiative. As an automatic backup method, a method that uses directory duplexing is available. In the example of FIG. 4, by keeping a directory in the storage means 105 of the home gateway 10 same as a directory in the local disk 112 of the personal computer 11 as a duplexed configuration, data to be stored in the local disk 112 can be automatically stored in the storage means 105 of the home gateway 10. An initiative processing can be performed, for example, by specifying the storage means 105 of the home gateway 10 as a data storing destination only for data for which backup processing is required according to user's judgment. Instead of the personal computer 11, even in the case of the audio device 12, the video device 13, or the like, it is possible to perform the processing described above in a similar manner. For example, audio data, image data, and the like can be stored as backup data in the storage means 105 of the home gateway 10. If the audio device 12 or the video device 13 does not have such control function in itself, it can be configured to perform the processing through the personal computer 11 connected to the same private communication network.

Figure 5:
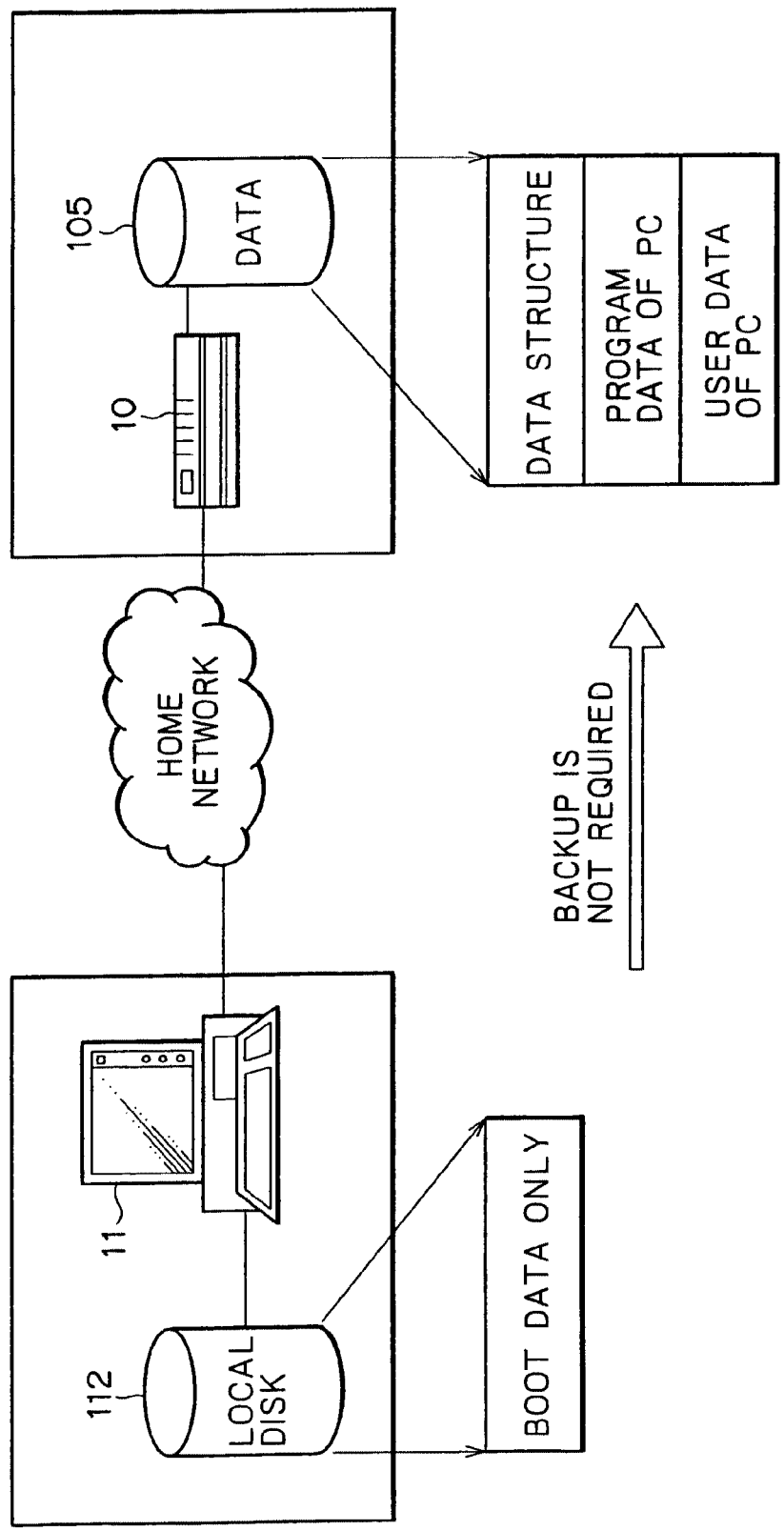
FIG. 5 is an explanatory diagram illustrating a backup function (example 2) of a gateway in a communication network system according to the present invention.

The example shown in FIG. 4 is a configuration in which all data are backed up in the storage means 105 of the home gateway 10. As shown in FIG. 5, however, it is possible to have a configuration in which only boot data is stored in the local disk 112 of the personal computer 11 and program data and user data are stored in the storage means 105 of the home gateway 10. In the configuration shown in FIG. 5, the local disk 112 of the personal computer 11 stores only boot program, and the storage means 105 of the home gateway 10 stores all of application programs, user data, and the like. If the storage means 105 is configured as a mass storage means having two or more disk drives, for example, it is possible to store programs and processing data of two or more personal computers even when two or more personal computers are connected to the private communication network.

Not only configurations as shown in FIG. 4 and FIG. 5, it is also possible to have a configuration in which the accumulation means 105 of the home gateway 10 accumulates, or backs up and stores documents and the like, created by users using the personal computer 11, and the local disk 112 of the personal computer 11 stores application programs, OS, and the like.

Thus, by having the configuration in which the home gateway 10 comprises the accumulation means 105 that backs up and stores processing programs and processing data of the personal computer 11 and the other audio devices connected to the private communication network, even if the local disk 112 of the personal computer 11 is broken and as a result becomes inaccessible for example, the program or the data can be acquired from the accumulation means 105 of the home gateway 10. In addition, it is recommended that the accumulation means 105 of the home gateway 10 is configured with a mass accumulation means capable of storing two or more drives and further with a removable type allowing a new disk to be inserted to increase the capacity.

In the backup configuration using the accumulation means 105 in the home gateway 10, if two or more devices, for example, two or more personal computers are connected to the private communication network, processing of determining a personal computer in which backup data originates is required. For example, if a specific application program is stored as backup data in the accumulation means 105 of the home gateway 10, allowing two or more personal computers to load this program freely causes a license problem.

For the purpose of solving such problem, the home gateway is configured to have a license engine so that license confirmation is performed before downloading the backup data to terminals such as personal computers.

Figure 6:
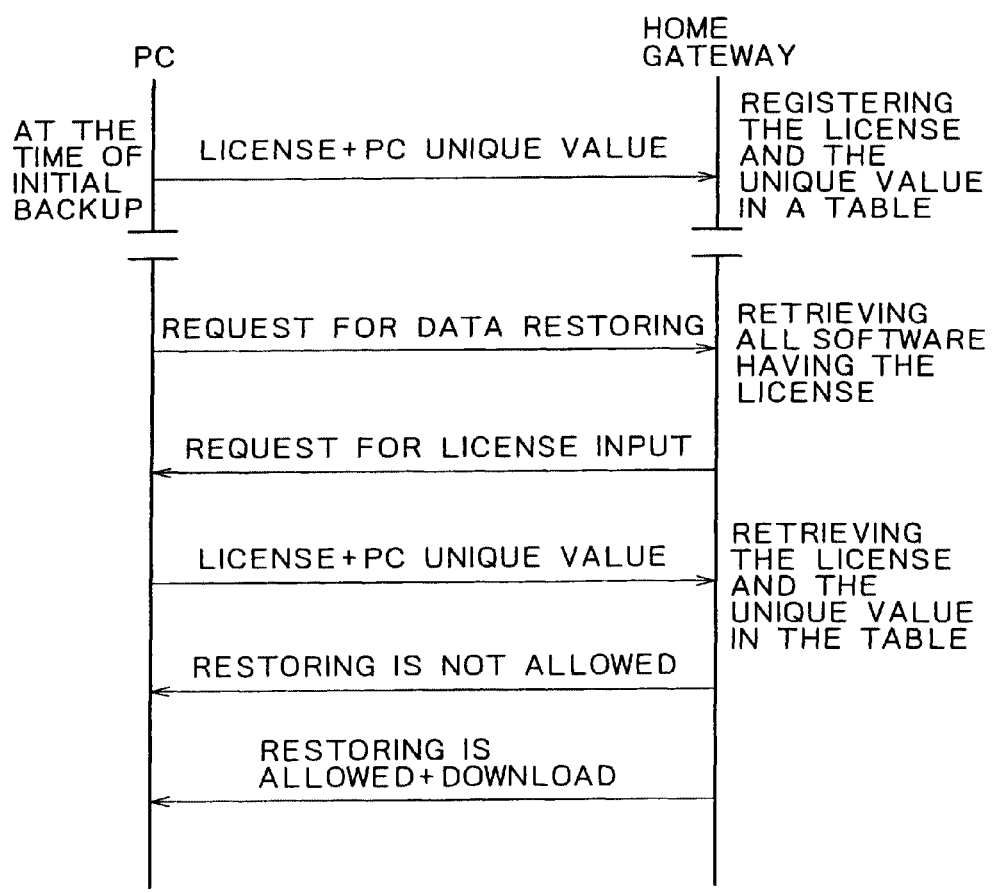
FIG. 6 is a diagram illustrating a sequence of license confirmation processing of a gateway in a communication network system according to the present invention.

FIG. 6 shows a processing sequence when program data is downloaded from a home gateway to a personal computer as a device connected to a private communication network. The following describes the sequence in FIG. 6. First, when the personal computer stores the program data in the home gateway, the personal computer transmits a license number of the program data and a unique value of the personal computer (for example, a unique data that is not rewritable such as a unique value obtainable from CPU of the personal computer, a serial number of the personal computer, and a production number) to the home gateway.

The license engine of the home gateway receives the license number and the unique value and registers them in a registration license table. In this connection, if one license number allows two or more devices to use the program data according to the license type, unique values of two or more personal computers are associated with one license number before the license number and the unique values are registered in the table.

After registering them, when a data restoring request, that is to say, a download request of the program data is output from the personal computer to the home gateway, the home gateway performs processing of detecting licensed software and then requests the personal computer to receive input of a license number.

On the personal computer side, after a license number is input, the license number is transmitted to the home gateway with the unique value of PC. The home gateway performs matching processing to check whether or not the license number and the unique value that have been received match the registered data. If matched data is not found, the home gateway notifies the personal computer that restoring is not allowed, in other words, download of the requested program data is rejected. If matched data is found in the table, the home gateway notifies the personal computer that restoring is allowed, in other words, download of the requested program data is allowed. Then, the home gateway transmits the data.

The example described above is an example of access to the accumulation means of the home gateway from a terminal connected to the private communication network. The access to the accumulation means of the home gateway may be allowed not only from the terminal within the private communication network but also via an outside public communication network. In this case, in order to have a configuration in which only an access request from a specific user or a specific device is responded to, the home gateway is configured to have a registration table for registering user identification values or for registering device identification values. Using this configuration, when the home gateway receives an access request for accessing the data accumulation means from outside other than the private communication network, for example, a mobile telephone or the like, the home gateway can receive a user identification value of an access request user or a device identification value from the mobile telephone, retrieve the registration table according to the received user identification value or the received device identification value to determine an access right, and allow or reject access according to the determination. In this connection, the home gateway is configured to have IP address, and PPP server function to enable accesses from various kinds of terminals.

[Data download to an outside terminal via the home gateway]

Next, processing when transferring data via the home gateway is described. Fundamentally, a gateway provides protocol conversion processing, which enables data communication via communication network having a different protocol. The home gateway 10 in the system according to the present invention includes an authentication engine that performs authentication processing for an access from outside via the home gateway, for example, an access through Internet or the like.

Figure 7:
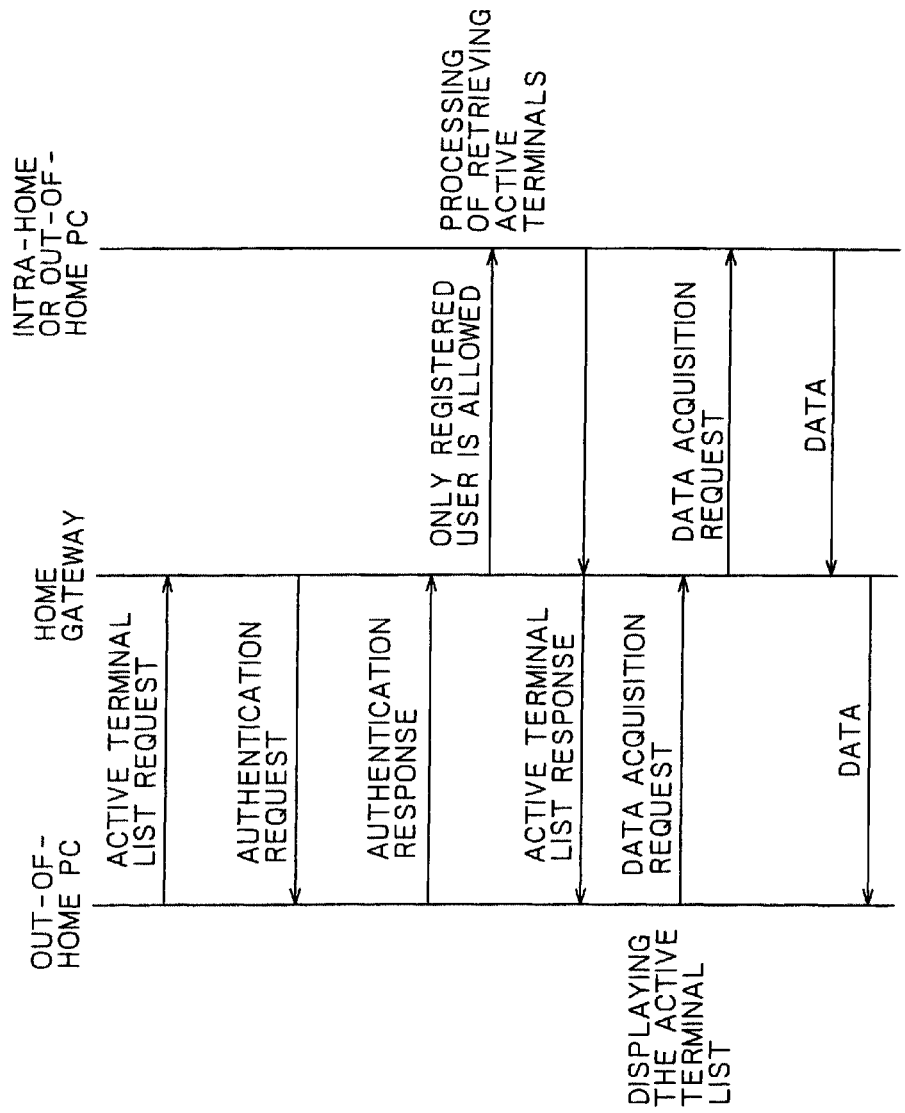
FIG. 7 is a diagram illustrating a sequence of data download from an outside terminal to an internal terminal via a gateway in a communication network system according to the present invention.

FIG. 7 shows a processing sequence when a terminal in the private communication network is accessed from outside via the public network. In FIG. 7, a terminal that tries an access from outside via the public network is shown as an out-of-home PC. A terminal in the private communication network is shown as an intra-home PC. In the example of FIG. 1, for example, the out-of-home PCs are the in-house personal computer 16 and 17 connected via the Internet and office LAN, and the intra-home PC is the personal computer 11.

FIG. 7 shows an example of processing in which the out-of-home PC acquires data from the intra-home PC (data download). The following describes the example according to the sequence. First, the out-of-home PC requests an active terminal list from the home gateway. The active terminal list is data that lists accessible terminals connected to the private communication network to which the home gateway is connected. The active terminal list is listed in the following manner: device unique information of a connected terminal is transmitted as device unique information from each active terminal to the home gateway; and the home gateway extracts and lists terminals having the corresponding unique value from registered device data. Generation processing of this active terminal list is detailed in Japanese Patent Application No. Hei 11-55625, which is a patent application applied for by the same applicant as that of the present invention. Therefore, the same method can be adopted.

The home gateway, which has received the request for the active list, transmits an authentication request to the out-of-home PC that issued the access request. The authentication processing is processing for checking whether or not a user issuing the access request is the authorized user who has been already registered in the home gateway. The out-of-home PC, which has received the authentication request, transmits an authentication response as a response to the request. As an authentication method, there is a method that requires password entry, or the following method: a PC reads a unique value on a card that records the unique value, such as an IC card, when the card is inserted in the PC or brought near to the PC; and then the unique value is transmitted to the home gateway. The home gateway performs matching processing to check whether the transmitted password or the unique value of IC card matches data in a registered user table stored in memory of the home gateway. When matched data is found, the access request is authenticated indicating that it is an access request performed by the authorized user having access right. If the authentication is failed, subsequent processing is not performed, and as a result the access request is rejected.

When the authentication completed successfully, the home gateway retrieves active terminals connected to the private communication network. In other words, the home gateway retrieves accessible terminals of which power are turned on. As described above, this processing is performed in the following manner: device unique information are received as device unique information from connected terminals of which power are turned on; and terminals having the corresponding unique value are extracted and listed from registered device data. The home gateway transmits the generated list, that is to say, the active terminal list to the out-of-home PC that issued the access request. The processing covering from the authentication processing to returning this active list is applicable because processing of normal HTTP 1.0 or more can pass through an in-house firewall.

On the out-of-home PC, which has received the active list, the list is viewed on a browser for example to specify an access directory of an access destination terminal, and then an data acquisition request is transmitted to the access destination terminal. The intra-home PC, which has received the data acquisition request via the home gateway, transmits the corresponding data to the out-of-home PC. As a result, the out-of-home PC can receive the data.

By the way, the above example is described as a configuration in which overall access right to terminals connected to the home gateway is registered in the home gateway. However, the access right registration table can be configured to set accessible users for each individual terminal connected to the private communication network or for each individual directory in one terminal. This enables us to set a range of accessible data for each user who accesses from outside in more detail.

For example, it is possible to have the following configuration, and the like: user A is allowed to access all terminals (from 1 to N) connected to the home gateway; and user B is allowed to access only directory aaa of terminal 1.

Figure 8:
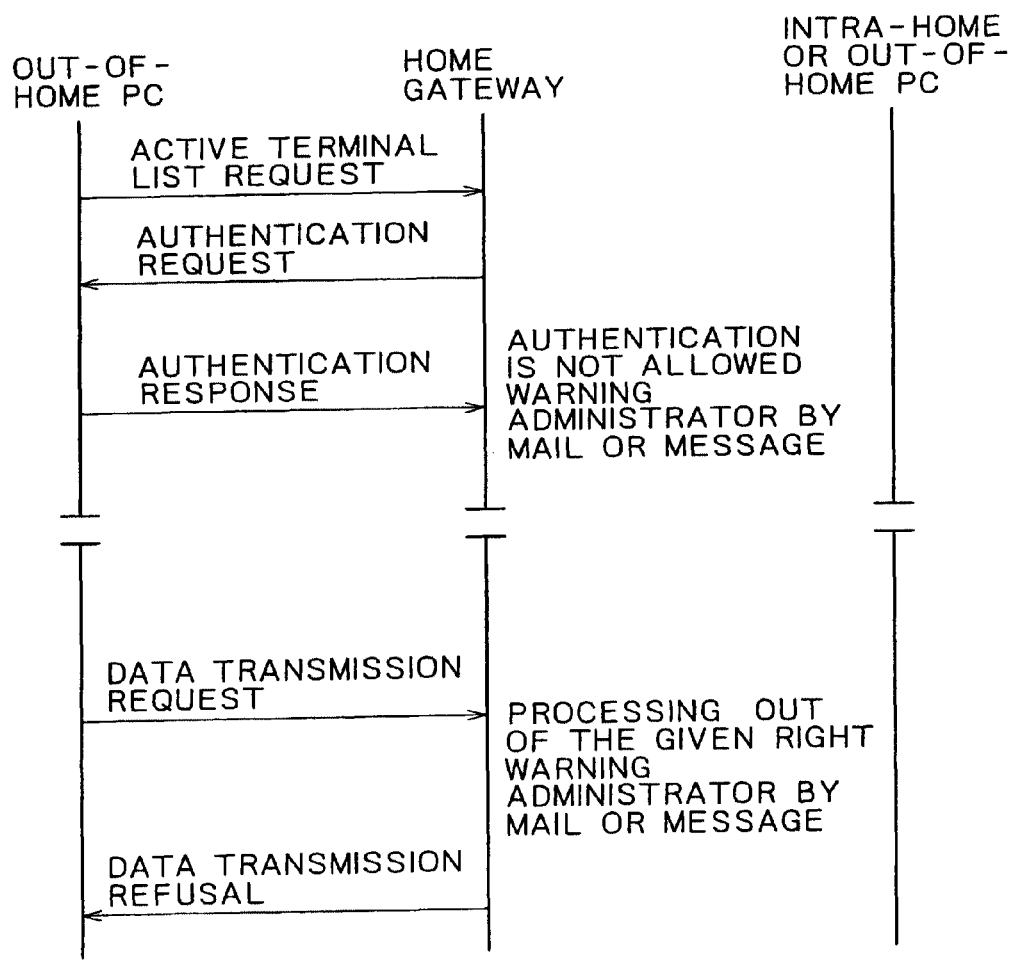
FIG. 8 is a diagram illustrating access-right confirmation processing for data download from an outside terminal to an internal terminal via a gateway in a communication network system according to the present invention.

In addition, it is possible to manage unauthorized access status by having a configuration in which access request log information of users that are not registered in the home gateway is stored in the home gateway and the log information is transmitted automatically periodically to an administrator of the home gateway. The sequence of this processing is shown in FIG. 8. In this case, the home gateway is configured to transmit log data of access requests, which failed in authentication, automatically to the administrator as a message or a mail. Moreover, if an authority of a request for processing is higher than the authority that is given to the user, a log including such status is generated and transmitted to the administrator as a message or a mail. A data processing engine of the home gateway performs the processing described above. In this connection, data transmission to the administrator may be performed judging from a condition of log accumulation or at the interval of a predetermined period.

[Data Upload from an Outside Terminal Via the Home Gateway]

Next, data input processing to a terminal in the private communication network connected to the home gateway, in other words, processing when data is transmitted from an outside PC to a terminal in the private communication network is described.

Figure 9:
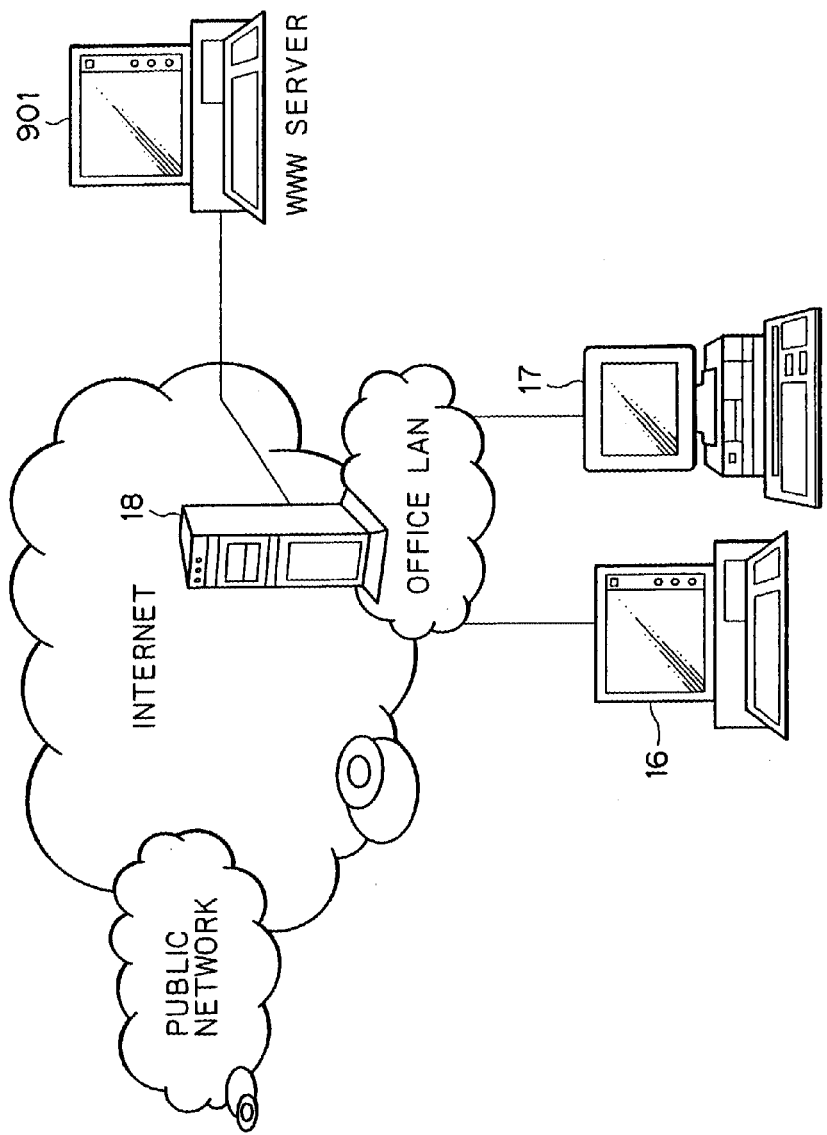
FIG. 9 is a diagram illustrating processing environment of data upload from an outside terminal to an internal terminal via a gateway in a communication network system according to the present invention.

Generally speaking, in a configuration in which many communication terminals are installed in one organization such as a company, a firewall is placed to limit free connections from outside for security protection. For example, as shown in FIG. 9, WWW server 901 in an organization such as a company is placed outside firewall 18, and two or more terminals as in house resources are placed inside the firewall 18. WEB connection from outside through Internet, and the like, generally enables a mail to be transmitted or received by allowing access to the WWW server 901 placed outside the firewall 18. WWW access from an in-house terminal to outside is enabled by passing through a proxy server that is a partial function of the firewall. In addition, WWW and functions other than mail can also be realized by using SOCKS server. General firewall configuration prohibits all of applications other than those described above. As regards such configuration, FIG. 10 shows a processing sequence of transferring data to an intra-home terminal (PC) connected to the private communication network including the home gateway.

Figure 10:
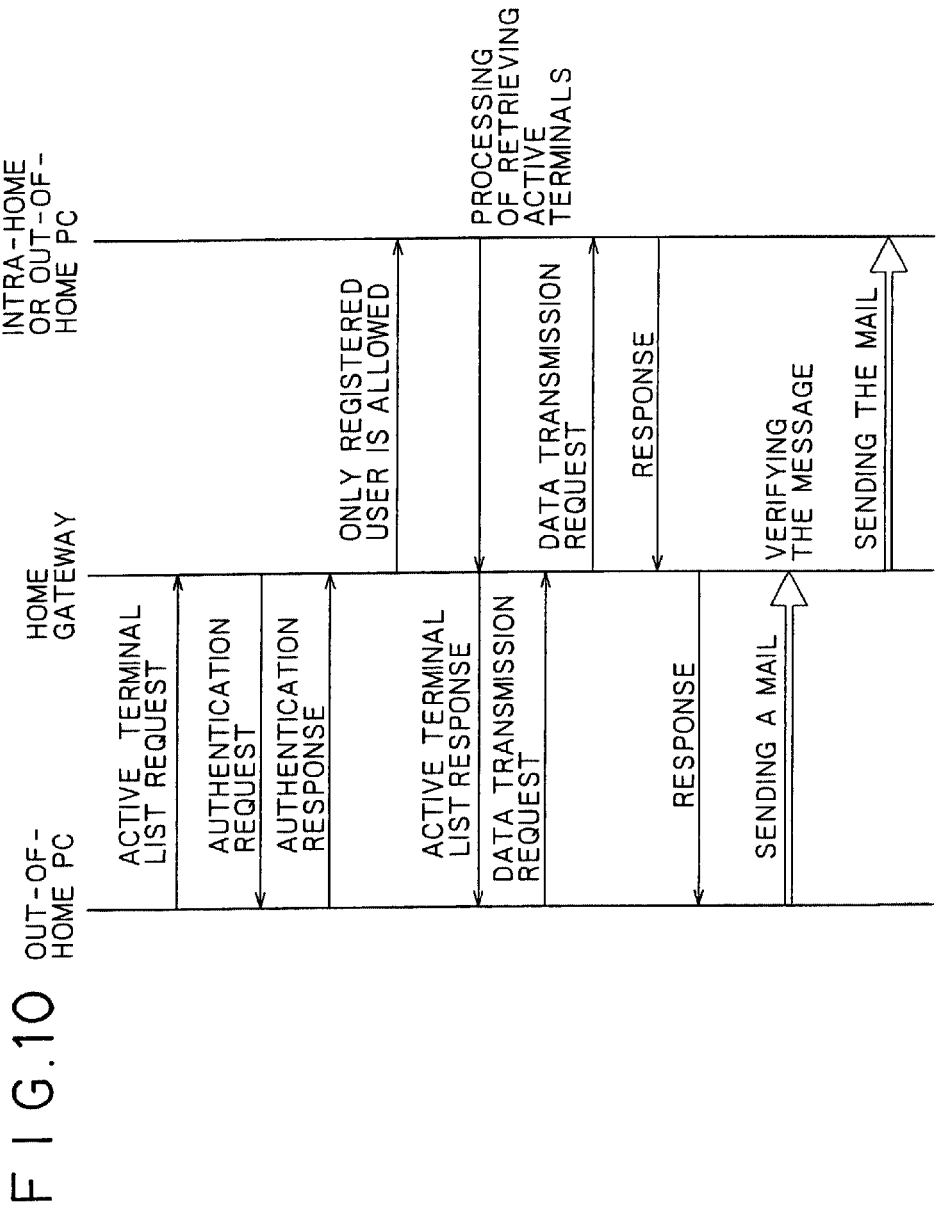
FIG. 10 is a diagram illustrating a sequence of data upload from an outside terminal to an internal terminal via a gateway in a communication network system according to the present invention.

In the processing sequence of FIG. 10, the following processing are the same as those described in FIG. 7: a request for an active terminal list from an out-of-home PC; an authentication request from the home gateway; an authentication response from the out-of-home PC; generation of the active terminal list by the home gateway; processing of active terminal list response from the home gateway to the out-of-home PC. In data upload processing shown in FIG. 10, in the next place, a data transmission request, which specifies a terminal selected from the active terminal list in the out-of-home PC, is transmitted to the intra-home PC as the selected terminal via the home gateway. From the intra-home PC that has received the transmission request, a response that approves the data reception is transmitted to the out-of-home PC. As a manner of data upload from the out-of-home PC, as shown in the figure, upload data is transmitted by a mail using the response as a key, or there is a method by which it is realized as JAVA applet using HTTP.

As processing of ensuring security of transmitting data, for example, the following processing is possible: when a response is transmitted from the intra-home PC, a key for encrypting transmission data is included; and then the out-of-home PC encrypts transmission data using this key before transmitting the data. For example, the intra-home PC transmits a public key or a public key certificate to the out-of-home PC, and the out-of-home PC encrypts transmission data using the received public key and transmits it to the intra-home PC. The intra-home PC, which has received the encrypted data, can decrypt the encrypted data using a secret key that is paired with its own public key. A method of encryption processing is not limited to the public key method. It is possible to have a configuration in which encryption processing by means of symmetric key is performed.

In this connection, safer data upload can be performed by the following configuration: before transmitting and receiving data between the out-of-home PC and the intra-home PC that perform data transmission and reception, mutual authentication processing by means of public key cryptography or symmetric key cryptography is performed; only when the authentication completes successfully, data transmission from the out-of-home PC is allowed.

[User Communication-Destination Retrieving-Processing]

Next, user communication-destination retrieving-processing in the system according to the present invention is described. This function provides a reliable access for various communication terminals such as a PC, and a mobile telephone by the following process: registered user's routing address information including the user's (that is, registered user) terminal, mail address, and telephone number is registered in the home gateway; and when another user (retrieving user) contacts to the registered user, a communication-destination of the registered user registered in the home gateway, that is to say, the routing address is extracted.

Figure 11:
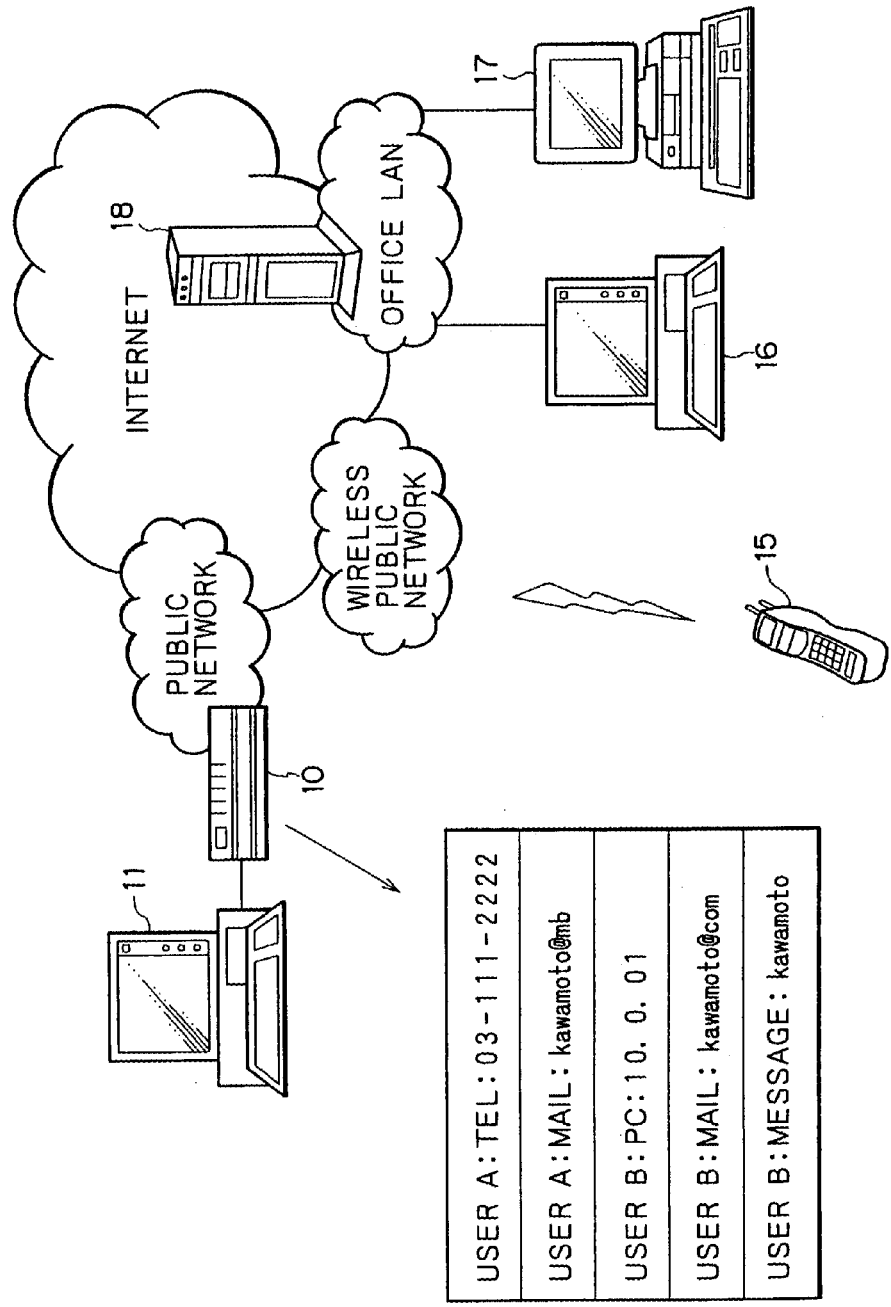
FIG. 11 is an explanatory diagram illustrating an outline of user communication-destination retrieving-processing using a gateway in a communication network system according to the present invention.

FIG. 11 is a diagram illustrating an outline of this configuration. There are users A and B as users who use the personal computer 11 connected to the home gateway 10. Each of the users has a mail address and can use two or more communication terminals such as a mobile telephone, other than the PC.

As actually available active-terminal information, the users A and B register model information of a terminal (such as PC) and routing information (such as a mail address), for each user, in the home gateway 10. A method for registering the information is similar to that of generating active terminal list described above: device unique information from a terminal connected to the home gateway—and from a communication terminal as a non-connected terminal including a mobile telephone and PHS for example—is transmitted to the home gateway as device identification information; and the home gateway extracts the communication terminal having the corresponding unique value from the registered device data to make a table. Generation processing of this table is described in Japanese Patent Application No. Hei 11-55625, which is a patent application applied for by the same applicant as that of the present invention. Therefore, the same method can be adopted.

When another user (retrieving user) tries to contact to the user registered in the home gateway 10 (registered user), the retrieving user can obtain a communication-destination of the retrieving user by accessing the home gateway 10 to obtain the registered information of the user condition table. HTTP is used as protocol when accessing the home gateway 10. A configuration that uses HTTP browser enables the registered user to display table information of the home gateway in the browser to view communication-destinations of the registered users. In addition, it is recommended to have a configuration that is adapted to WAP (Wireless Access Protocol) and i-Mode (Compact-HTML) to enable acquisition of the home gateway table information from a mobile telephone. FIG. 12 shows a processing sequence of the user retrieving processing.

The following describes the processing sequence of FIG. 12. To begin with, a registering user registers utilized terminal information in the home gateway. For example, the information includes model information of a terminal (such as PC) and routing information (such as a mail address, a telephone number), for each user. Upon receipt of such information, the home gateway registers the information in the user condition table explained using FIG. 11. The information is registered as information of terminals that are active, in other words, capable of communicating. After registration, the home gateway transmits a response, which indicates the registration completed, to the registration request user.

Next, the retrieving user who requests communication with the registered user accesses the home gateway, and requests it to retrieve an access destination for accessing the registered user. In this case, the home gateway obtains meta-information to confirm a terminal ID and a user ID of the user who issues the retrieval request. As regards obtaining the meta-information, user-agent is available when HTTP is used for example. It is also possible to have a configuration in which the utilized terminal information of the retrieving user is identified by applying CC/PP that is proposed as a structure for describing user or device function using RDF (Resource Description Framework). Or it may be configured to identify the utilized terminal information using a cookie of HTTP. Using P3P enables user identification based on a browser installed in the terminal. In such a manner, the retrieving user or terminal is identified, and then the home gateway provides, according to the terminal used, the retrieving user with the communication-destination information of the registered user, that is, stored data in the user condition table.

By the way, as shown in FIG. 12 in dotted lines, it is possible to have a configuration in which the home gateway provides only specific users with the access destination information for accessing the registered user by issuing an authentication request to the retrieving user. This authentication processing can be executed as the following processing for example: identification values of retrieving users to which notification of communication destination is allowed by a registered user are registered in the home gateway; the retrieving user who issued the retrieval request is requested the identification value, which is matched with the registered data. In this case, a range of access right can be set for each request terminal or each retrieving user, which issued the access request. For example, if access is a mail to PC, the access is allowed; but access to a mobile telephone is not allowed.

Moreover, if the home gateway holds a log of access requests from retrieving users having no access right as an access history and transmits the log to the registered user, the registered user can know the access situation.

The following specifically describes an example of the processing. For example, when user A having a mobile telephone contacts to user B, the user A can access the home gateway using the mobile telephone to obtain access destination information regarding the user B that is registered in the user condition table of the home gateway. As a result of a response received from the home gateway, the user A can telephone or send a mail by one click operation according to the information received from the home gateway making the most of tags used in WAP (Wireless Access Protocol) and i-Mode (Compact-HTML). In this connection, the home gateway is configured to have functions of IP address and PPP server to enable accesses from various terminals.

Up to this point, the present invention was detailed with reference to the specific embodiments. However, it is apparent that persons skilled in the relevant art(s) can modify and replace the embodiments within a range of main points of the present invention. In other words, because the embodiments of the present invention are illustrated as examples, they should not be interrupted in a limited manner. To judge the main points of the present invention, claims described at the outset should be taken into account.

As described above, regarding the communication network system, the gateway, the data communication method, and the program providing medium according to the present invention, data communication having advanced functionality is enabled by adding functions of routing information providing processing and authentication processing to a gateway. This configuration can prevent unauthorized data writing and reading when a terminal in a local (private) communication network connected to a gateway is accessed from a public communication network such as Internet. Moreover, a configuration that provides an active terminal list and a user condition table enables a person, who issues an access request, to retrieve a desired access destination easily.

The invention claimed is:
1. A home gateway device, comprising:
an interface unit configured to communicate with two communication networks;
a storage unit configured to function as a remote storage repository that stores application program data for a terminal communicatively coupled to the home gateway device through one of the two communication networks, the application program data controlling a function of the terminal, said storage unit accumulating backup data of the application program data stored locally at the terminal, automatically or in a manner specified by a user; and a registration unit configured to register a user identification information or a device identification information in the storage unit, wherein the home gateway device requests transmission of an access request to receive the application program data, and requests transmission of a user identification information or a device identification information, authenticates the user identification information or the device identification information and determines whether or not the terminal corresponding to the user identification information or the device identification information is allowed to receive the application program data from the storage unit.

2. A home gateway device, comprising:

an interface unit configured to communicate with private network and public network;

a storage unit configured to function as a remote storage repository that stores application program data for a terminal communicatively coupled to the home gateway device, wherein the application program data controls a function of the terminal, and is executable at the terminal in the private network, said storage unit accumulating backup data of the application program data stored locally at the terminal, automatically or in a manner specified by a user; and a registration unit configured to register a device identification information in the storage unit, wherein the home gateway device requests transmission of an access request to receive the application program data, and requests transmission of a device identification information, authenticates the device identification information received from the terminal in the private network to determine whether or not the application program data stored in the storage unit is allowed to be used by the terminal from the storage unit.

3. A home gateway device, comprising:

interface means for communicating with first protocol network and second protocol network;

storage means for functioning as a remote storage repository that stores application program data for a terminal communicatively coupled to the home gateway device, wherein the application program data controls a function of the terminal, and is executable at the terminal in the first protocol network, said storage means accumulating backup data of the application program data stored locally at the terminal, automatically or in a manner specified by a user;

registration means for registering a device identification information in the storage means;

receiving means for receiving from the terminal an access request to receive the application program data, and for receiving from the terminal a device identification of the terminal;

authentication means for authenticating the terminal with the device identification received by the receiving means by using the registration means; and conversion means for converting the application program data for execution at the terminal for transmission to the terminal in response to the authentication means determining that the terminal is authenticated.

4. A communication device, comprising:

interface means for communicating with two different protocol networks;

storage means for functioning as a remote storage repository that stores application program data for a terminal communicatively coupled to the communication device through one of the two different protocol networks, the application program data controlling a function of the terminal, said storage means accumulating backup data of the application program data stored locally at the terminal, automatically or in a manner specified by a user;

registration means for registering a device identification information in the storage means;

receiving means for receiving from the terminal an access request to receive the application program data, and for receiving from the terminal a device identification of the terminal;

authentication means for authenticating the terminal with the device identification received by the receiving means by using the registration means; and conversion means for converting the application program data for execution at the terminal for transmission to the terminal from one of the two different protocol networks to the other of the two different protocol networks in response to the authentication means determining that the terminal is authenticated.

5. The home gateway device of claim 1, wherein the terminal includes a plurality of terminals, and the plurality of terminals include a personal computer and at least one of an audio device and a video device.

6. The home gateway device of claim 1, wherein said storage unit is further configured to store a license number of the application program data.

7. The home gateway device of claim 2, wherein the terminal includes a plurality of terminals, and the plurality of terminals include a personal computer and at least one of an audio device and a video device.

8. The home gateway device of claim 2, wherein said storage unit is further configured to store a license number of the application program data.

9. The home gateway device of claim 3, wherein the terminal includes a plurality of terminals, and the plurality of terminals include a personal computer and at least one of an audio device and a video device.

10. The home gateway device of claim 3, wherein said storage means further stores a license number of the application program data.

11. The communication device of claim 4, wherein the terminal includes a plurality of terminals, and the plurality of terminals include a personal computer and at least one of an audio device and a video device.

12. The communication device of claim 4, wherein said storage means further stores a license number of the application program data.

* * * * *